United States Patent
Jaena et al.

(10) Patent No.: US 9,190,791 B1
(45) Date of Patent: Nov. 17, 2015

(54) ELECTRICAL BUSWAY SPLICE CONNECTOR

(71) Applicant: Power Distribution, Inc., Richmond, VA (US)

(72) Inventors: Mario L. Jaena, Kent, WA (US); Vladimir Gulkarov, San Diego, CA (US); Isaac Folk, Glen Allen, VA (US)

(73) Assignee: Power Distribution, Inc., Richmond, VA (US)

( * ) Notice: Subject to any disclaimer, the term of this patent is extended or adjusted under 35 U.S.C. 154(b) by 1 day.

(21) Appl. No.: 14/448,043

(22) Filed: Jul. 31, 2014

(51) Int. Cl.
*H01R 25/16* (2006.01)

(52) U.S. Cl.
CPC .................................. *H01R 25/162* (2013.01)

(58) Field of Classification Search
CPC ........................................... H01R 25/162
USPC ......... 439/210, 113, 207, 209, 213, 507, 509; 174/68.1, 71 B, 72 B, 88 B, 88 R, 149 B
See application file for complete search history.

(56) References Cited

U.S. PATENT DOCUMENTS

| | | | |
|---|---|---|---|
| 3,181,102 A | 4/1965 | Fehr, Jr. | |
| 3,189,679 A | 6/1965 | Scofield | |
| 3,475,567 A | 10/1969 | Hollander | |
| 4,179,174 A | 12/1979 | Jorgensen | |
| 4,462,657 A * | 7/1984 | Snowdon et al. .... | H01R 13/187 439/724 |
| 5,336,097 A | 8/1994 | Williamson, Jr. et al. | |
| 5,449,056 A | 9/1995 | Ross | |
| 5,588,884 A * | 12/1996 | Rudoy et al. ........... | H01R 31/02 439/787 |
| 5,609,254 A | 3/1997 | Loftus et al. | |
| 5,760,339 A | 6/1998 | Faulkner et al. | |
| 5,854,445 A | 12/1998 | Graham et al. | |
| 6,039,584 A | 3/2000 | Ross | |
| 6,105,741 A | 8/2000 | Ross | |
| 6,296,498 B1 | 10/2001 | Ross | |
| 6,517,363 B2 | 2/2003 | Ross | |
| 6,521,837 B2 | 2/2003 | Hilgert et al. | |
| 6,803,523 B2 * | 10/2004 | Yuasa et al. ............ | H01R 13/17 174/88 B |
| 6,805,226 B1 | 10/2004 | Ross et al. | |
| 6,870,103 B1 | 3/2005 | Wiant et al. | |
| 6,983,742 B2 | 1/2006 | Jordan et al. | |
| 7,014,516 B2 * | 3/2006 | Yang ..................... | H01R 13/187 439/170 |
| 7,374,444 B1 | 5/2008 | Bennett | |
| 7,468,488 B1 | 12/2008 | Hilgert | |

(Continued)

*Primary Examiner* — Abdullah Riyami
*Assistant Examiner* — Harshad Patel
(74) *Attorney, Agent, or Firm* — Snell & Wilmer LLP

(57) ABSTRACT

A splice connector for a busway system utilizes individual connectors made of a conductive material and having a u-shaped cross-section that fit over ends of a pair of busbars to be connected to each other, and within which are mounted multi-contact louvers that extend the length of the connectors to establish a low impedance electrical connection between the connector and the respective busbars. The louvers are secured in place by a dovetail groove that retains the louvers within the connectors and causes the individual contact sections of the louvers to bow outwardly so as to press against the busbars when the connector is fitted over the busbars. The connectors are snapped into insulative housing halves or sections that align the connectors with the busbars, and that provide isolation between horizontally aligned pairs of connectors. A planar insulator board provides separate between vertically-aligned pairs of busbars when the connectors are fitted over the busbars and the insulative housing sections are aligned and secured to each other. Spacers may be utilized to enable different sized u-shaped connectors to fit within a standard insulative housing.

13 Claims, 4 Drawing Sheets

(56) References Cited

U.S. PATENT DOCUMENTS

| | | |
|---|---|---|
| 7,470,861 B1 | 12/2008 | Ross et al. |
| 7,678,995 B2 * | 3/2010 | Hengel et al. ........ H01R 4/4881 174/88 B |
| 7,819,676 B1 | 10/2010 | Cardoso et al. |
| 2008/0302553 A1 | 12/2008 | Ross et al. |
| 2012/0264317 A1 * | 10/2012 | Balcerak et al. ..... H01R 13/514 439/212 |
| 2013/0171849 A1 | 7/2013 | Mooney et al. |

\* cited by examiner

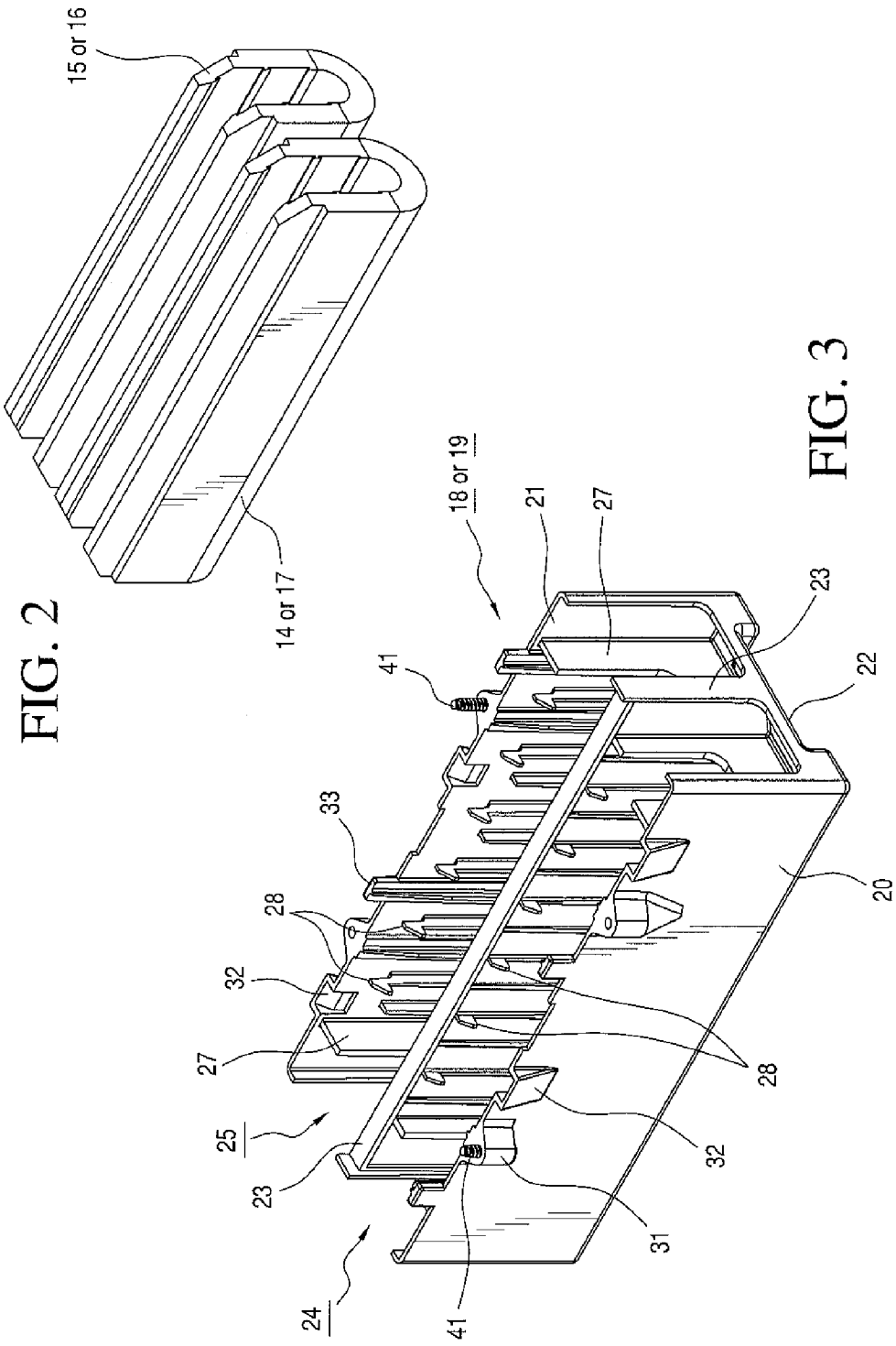

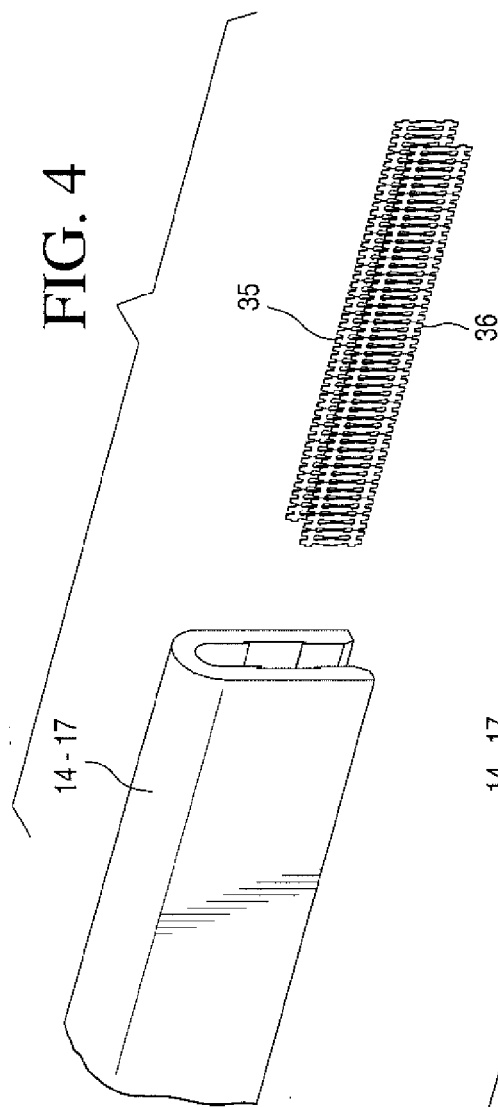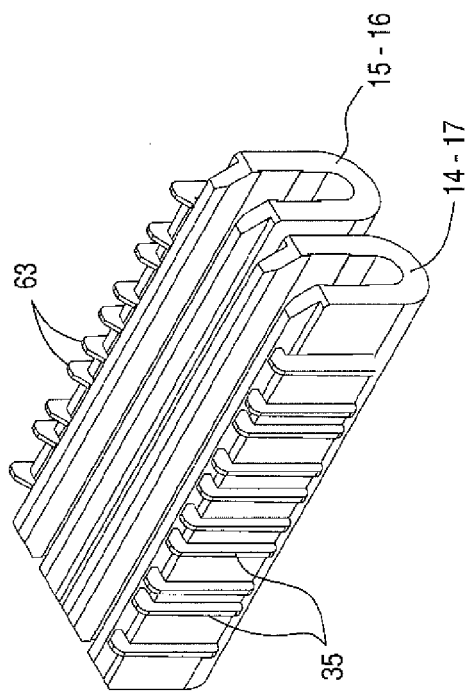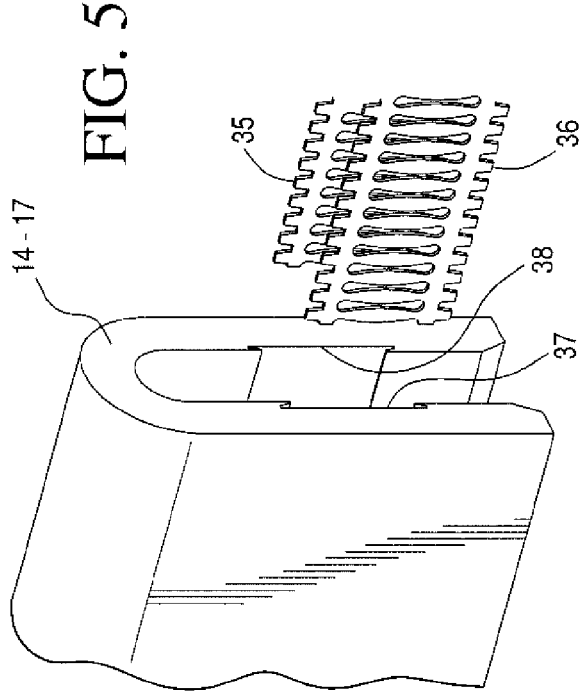

ELECTRICAL BUSWAY SPLICE CONNECTOR

BACKGROUND OF THE INVENTION

1. Field of the Invention

The invention relates to a splice connector for joining or connecting sections of an electrical busway.

In a preferred embodiment, the splice connector includes four horizontally and vertically spaced u-shaped busbar connectors with internal contact louvers, and two insulating housing sections, each accommodating two of the bus bar connectors. Horizontal spacing and isolation of the individual bus bar connectors in each of the housing sections is provided by an internal vertically-extending separating wall, while vertical isolation is provided by a separate planar spacer that is positioned between the housing sections.

2. Description of Related Art

The rigorous demands of mission critical data center sites require methods to quickly disconnect and reconnect equipment without removing power from any other equipment. One way to meet these demands is to supply power via a modular "Continuous Bus Power Distribution System" (CBusPDS), which uses busways mounted overhead, on a wall, or under a raised floor to provide continuous power to equipment or equipment cabinets via plug-in power taps that can be inserted into the busways anywhere along their length. The overhead or wall mounted CBusPDS configuration allows users/installers to quickly insert or relocate plug-in power taps for added or replacement equipment, and to quickly remove the power taps for repair or replacement as necessary. An example of such a busway is the PDI Power-Wave Bus System™ available from Smiths Power and described in U.S. Pat. No. 7,819,676. Other examples of busways with removable power taps include is Universal Electric Corporation's StarLine® Track Busway, described in U.S. Pat. Nos. 6,521,837; 6,517,363; and 6,296,498, and the busways or tracks disclosed in U.S. Pat. Nos. 5,336,097; 5,449,056; 6,039,584; 6,105,741; 6,296,498; 6,521,837; 6,517,363; 6,805,226; 7,374,444; 7,468,488; and 7,470,861; and U.S. Patent Publication No. 2008/0302553.

In general, electrical distribution systems in the form of busways or tracks are made up of multiple straight, angled, and branching sections that can be connected together to fit different installation configurations. The electrical connectors that are used to join the sections are referred to as splices and generally include a set of connectors for electrically connecting together respective busbars in the busway sections to be joined. Examples of busway splices are disclosed in the above-cited U.S. Pat. No. 7,819,676, as well as which describes the PDI PowerWave Bus System™, as well as U.S. Pat. Nos. 3,181,102; 3,189,679; 3,475,567; 5,609,254; 4,179,174; 5,760,339; and 5,854,445; 6,870,103; 6,983,742; and 7,678,995; and U.S. Patent Publication No. 2013/0171849.

In addition to connecting busbars in respective busbar sections, busbar connectors may be used in contexts that do not involve busway splices, such as the motor drive connection system of U.S. Patent Publication No. 2012/0264317, which pairs of u-shaped bus bar connectors housed in a single insulator housing, the bar connectors being mutually separated by an inner, vertically extending wall of the insulator housing. The arrangement of the present invention also utilizes an insulating housing with a vertically extending separator wall, but the insulting housing is arranged in upper and lower sections, and the splice includes a number of additional features not included in the arrangement of U.S. Patent Publication No. 2012/0264317, such as the use of multi-contact louvers in the individual busbar connectors and the inclusion of a vertical separator plate, which make the splice connector of the present invention especially suitable for use in modular power distribution systems such as the PDI PowerWave Bus System™

SUMMARY OF THE INVENTION

An improved splice connector for sections of a power distribution busway includes upper and lower insulating housing sections arranged to support individual busbar connectors, each electrically connecting a respective busbar in each of the busway sections to be joined. The insulating housing sections are arranged to provide isolation between horizontally adjacent busbar connectors, while a separate plate is arranged to provide isolation between vertically adjacent busbar connectors in the respective upper and lower housing sections.

According to preferred embodiments of the invention, the splice connector utilizes individual connectors made of a conductive material and having a u-shaped cross-section that fit over ends of a pair of busbars to be aligned and electrically connected to each other, and within which are mounted multi-contact louvers that extend the length of the connectors to establish a low impedance electrical connection between the connector and the respective busbars. The louvers are secured in place by a dovetail groove that retains the louvers within the connectors and causes the individual contact sections of the louvers to bow outwardly so as to press against the busbars when the connector is fitted over the busbars. The connectors are snapped into insulative housing halves or sections that align the connectors with the busbars, and that provide isolation between horizontally aligned pairs of connectors. A planar insulator board provides separate between vertically-aligned pairs of busbars when the connectors are fitted over the busbars and the insulative housing sections are aligned and secured to each other to provide an easily assembled splice connection with a minimal number of parts and requiring a minimal number of assembly steps. A ground shunt in the form of a strap extends between and is secured to the busway sections. An optional ground shunt cover, data/communication cable cover, and shield housing may be added to complete the splice connector of the preferred embodiment.

As an optional added feature, the shims or spacers may be utilized to enable different sized u-shaped connectors to fit within a standard insulative housing section, thereby enabling the splice connector to be easily adapted to busway systems having different sizes of busbar.

Although not limited to a particular busway configuration, the splice connector of the invention is especially suitable for use in connection with power supply busway systems having multiple high current busbars, such as a CBusPDS busway system, which typically includes four bus bars arranged in upper and lower pairs. Those skilled in the art will, however, appreciate that the invention is not to be limited to high current power supply systems such as the four busbar arrangement, or to particular shape, dimensions, and configuration of the busbars or conductors to be connected. For example, the splice connector of the invention may be adapted to connect busway sections that supply single phase power, two pole power, two pole power with a neutral, or three phase power with or without neutral plus ground or DC power.

BRIEF DESCRIPTION OF THE DRAWINGS

FIG. 2 is an isometric view of a pair of u-shaped connectors for use in the splice connector of FIG. 1.

FIG. 3 is an isometric view of an insulative housing section for use in the splice connector of FIG. 1.

FIG. 4 is an isometric view of one of the u-shaped connectors FIG. 2 together with a pair of multi-contact louvers to be inserted into the u-shaped connector.

FIG. 5 is an enlarged view of the connector and louvers of FIG. 4.

FIG. 7 is an isometric view of a pair of u-shaped connector and spacers for use in a second preferred embodiment of the invention.

DETAILED DESCRIPTION OF THE PREFERRED EMBODIMENTS

Throughout the following description and drawings, like reference numbers/characters refer to like elements. It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention.

Figure 1:
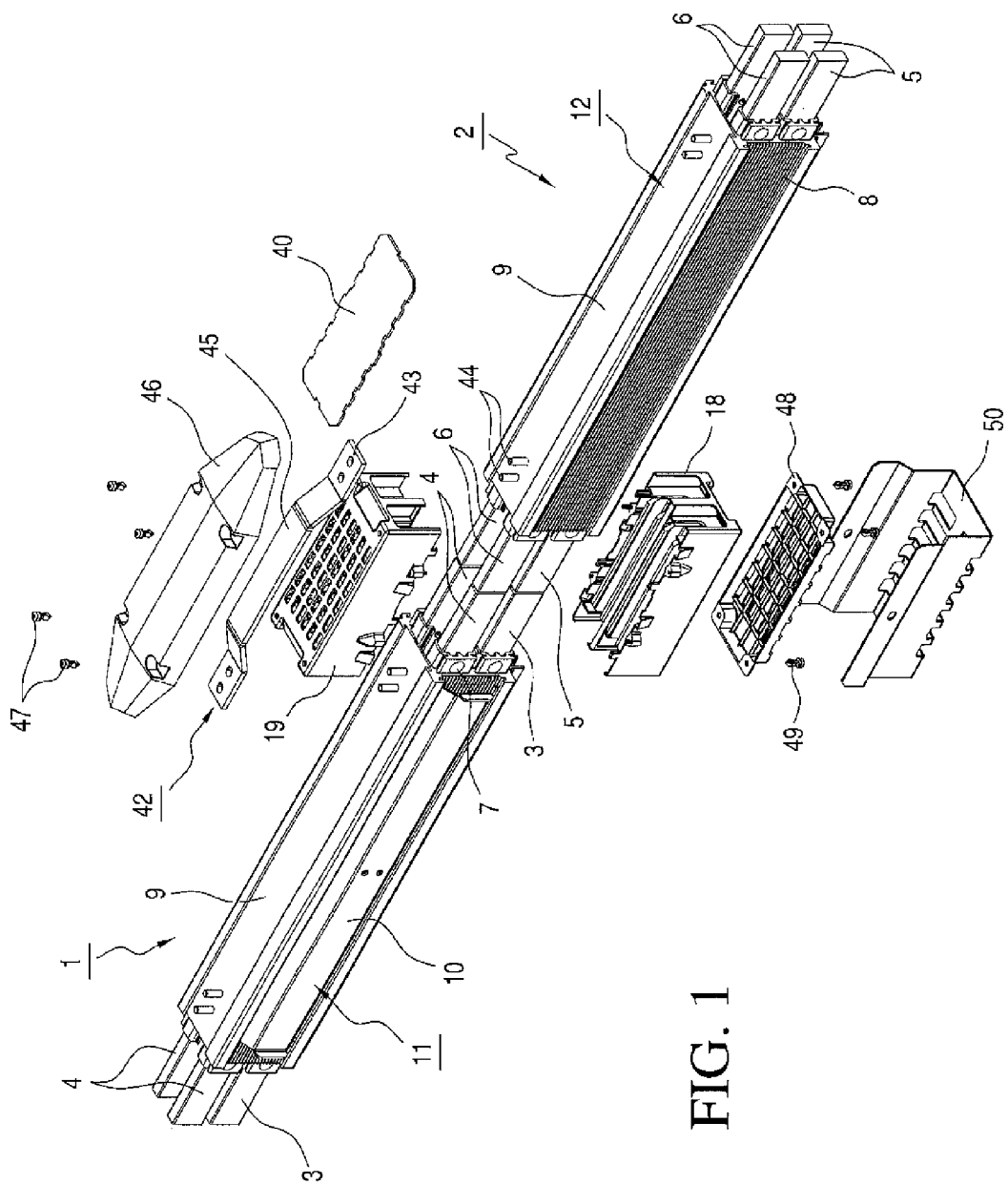
FIG. 1 is an isometric view illustrating components of the splice connector of a first preferred embodiment of the invention before assembly to a pair of busway sections.

FIG. 1 shows individual parts of a busway splice connection constructed in accordance with the principles of a first preferred embodiment of the invention, for coupling two exemplary busway sections 1 and 2. Busway section 1 includes a pair of lower busbars 3 and a pair of upper busbars 4, and busway section 2 includes a pair of lower busbars 5 and a pair of upper busbars 6, for supplying electricity to electrical equipment via plug-in power taps (not shown). The respective busway sections 1,2 include housings 11,12, brackets 7 for supporting the busbars 3-6, and/or various additional components (not shown) for receiving the power taps and enabling them to be electrically connected to the busbars 3-6. Illustrated features of the busway sections include grooved side panels 8 to facilitate heat dispersion, and metal top and side panels 9 and 10 that are either integral with the housings 11,12 or mounted therein to provide electromagnetic shielding around the busbars 3-6.

As shown in FIG. 1, the busbars 3-6 in the respective sections 1,2 are axially aligned so that ends 13 of the busbars face each other. The busway sections 1,2 may correspond to those disclosed in U.S. Pat. No. 7,819,676, incorporated herein by reference. However, the invention is not limited to a particular busway system. In addition, within a particular busway system, the sections may have different shapes and dimensions, and may include both straight and curved sections, or branched sections. While the busway sections illustrated in FIG. 1 are 1000A busway sections, the invention is in no way limited to a particular power rating or carrying capacity.

Electrical connection between the busbars 3-10 is provided by electrically-conductive connectors 14-17 having a generally u-shaped cross-section. Each of the connectors 14-17 receives a respective busbar end that extends from the busway sections 1,2. Two of the u-shaped connectors 14,15 are in turn housed within a lower insulating housing section 18 and two of the u-shaped connectors 16,17 are housed in an upper insulating housing section 19. Enlarged views of a pair of the u-shaped busbar connectors 14-17 and one of the insulating housing sections 18,19 are included in FIGS. 2 and 3.

As best shown in FIG. 2, the housing sections 18,19 are preferably made of a high strength, high temperature plastic material and are arranged to both securely receive and support the busbar connectors 14-17, and also to electrically isolate pairs of busbar connectors 14,15 and 16,17 from each other. To accomplish this, the housing sections 18,19 each includes two sidewalls 20,21 and a top/bottom wall 22 integral with and perpendicular to the sidewalls to form three sides of a structure having a rectangular or square cross-section. An isolating wall 23 extends transversely to the top/bottom wall 22 and parallel to the sidewalls 20,21 of the housing sections. Isolating wall 23 separates the housing sections 18,19 into two longitudinally-extending compartments 24,25 for receiving the u-shaped connectors 14-17.

At each end of the longitudinally-extending compartments 24,25 is a respective u-shaped connector bulkhead 26,27 having a u-shaped cut-out that matches an exterior shape of the u-shaped connectors 14-17, and into which the u-shaped connectors are fitted. The u-shaped connectors 14-17 are further supported and held in place by hooks or detents 28 extending from each side of the respective compartments 24,25, i.e., from the interior surface of sidewalls 20,21 and facing surfaces of the isolating wall 23, such that a distance between inwardly-extending ends of the hooks is slightly less than width of the u-shaped connectors, to form a snap-fit arrangement. In order to assemble the u-shaped connectors 14-17 to the insulating housing sections 18,19, the u-shaped connectors 14-17 are inserted into corresponding compartments 24,25 of the respective housing sections 18,19 by pushing them past the hooks or detents 28, causing the hooks or detents to flex sufficiently to permit passage of the connectors. When the u-shaped connectors 14-17 are fully inserted into the housing sections and the exterior surface of the housing sections are seated in the corresponding u-shaped cut-outs or slots of the bulkheads 26,27, the hooks or detents 28 clear the side walls of the connector and extend over the top edges 29,30 of the u-shaped connectors 14-17 to hold them in place. Optional vertically-extended ribs 34 extending from sidewalls 20,21 and/or isolating wall 23 may also be provided to further support and align the u-shaped connectors 14-17.

Additional features of the housing sections 18,19 include exterior fastening structures or flanges 31 that may be provided at facing edges of the housing sections 18,19 for receiving fasteners to secure the housing sections to each other when placed over the busbars 3-6, and optional alignment structures such as slots 32 and pillars 33 arranged to extend into the alignment slots to facilitate alignment of the housing sections during assembly.

As shown in FIGS. 4 and 5, u-shaped connectors 14-17 are arranged to include multi-contact slotted louvers 35,36. While the invention is not limited to a particular louver configuration or mounting arrangement, in the illustrated example, the u-shaped connectors 14-17 include dovetail grooves 37,38 into which the louvers 35,36 are fitted, such that when sides of the louvers 35,36 are positioned in the dovetail portions of the grooves 37,38, the louvers 35,36 are not only retained in place but also force to bow inwardly to securely engage the busbars 3-6 and thereby establish a good electrical connection between the busbars 3-6 and the connectors 14-17. The slots in the louvers 35,36 enable individual sections 39 of the louvers to conform to the exterior surfaces of the busbars 3-6 and thereby accommodate tolerances in busbar dimensions and position. Although FIGS. 4 and 5 only show one set of louvers 35,36 for each connector 14-17, it is within the scope of the invention to provide two or more sets of grooves 37,38 and louvers 35,36 in each of the connectors 14-17. An example of a part that may be used as a louver in the preferred splice connector is the "Contact SKT Solder ST Cable Mount Strip," Part No. 192004-8, by Tyco Electronics, although it will be appreciated that numerous other multiple contact strips may be substituted.

As illustrated in FIG. 1, after the u-shaped connectors 14-17 have been assembled to the respective upper and lower insulating housing sections 18,19, the corresponding busbars 2-10 are inserted into the corresponding connectors 14-17 such that pairs of busbars are axially aligned and electrically connected by the connectors.

In additional to the vertical isolation provided by isolating walls 23 of the respective upper and lower housing sections 18,19, horizontal isolation between upper and lower pairs of busbar connectors 14,15 and 16,17 in the respective housing sections 18,19 of the preferred splice connector is provided by a planar insulator or plate 40 that fits between the upper and lower busbar connectors 14,15 and 16,17 to complete the electrical isolation between the respective busbars. The dimensions of the planar insulator 40 are sufficiently large to enable the planar insulator 40 to extend between all of the busbar connectors 14-17, but are less than the dimensions of the mating interface between the two housing sections 18,19 so as to fit within the housing sections. To accommodate the planar insulator 40, the height of isolation wall 23 may be less than that of sidewalls 20,21 by an amount approximately equal to half the thickness of the planar insulator 40, thereby allowing the planar insulator 40 to be captured within the assembled housing formed by the two housing sections 18,19.

To complete the illustrated splice, the housing sections 18,19 are secured to each other by appropriate fasteners, such as threaded fasteners 41 extending through threaded through-holes in the vertically aligned exterior structures of flanges 31. Alternatively, latches, snap-fit arrangements, or other fastening means may be used to secure the housing sections 18,19 to each other.

Figure 6:
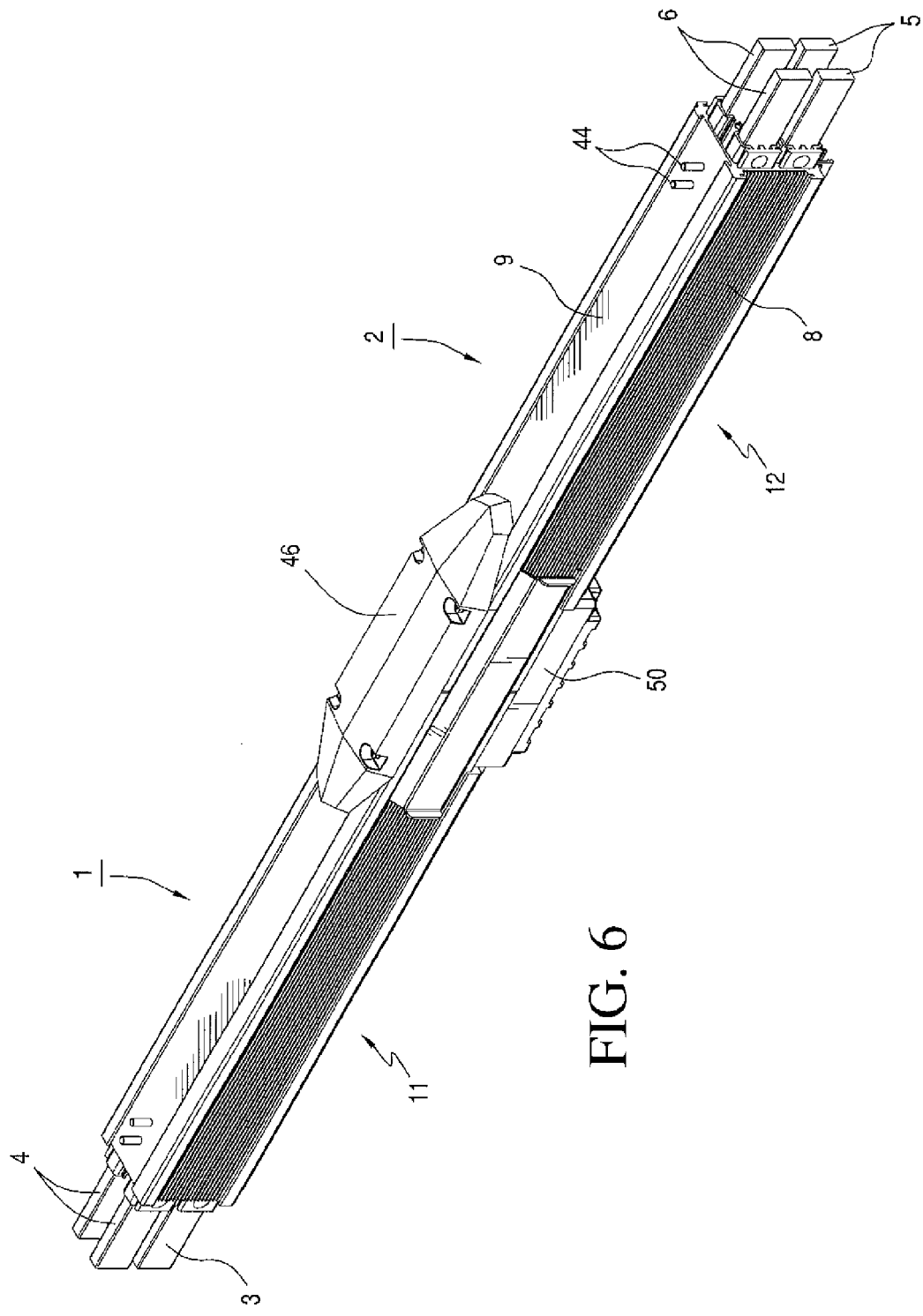
FIG. 6 is an isometric view showing an assembled splice connector.

After assembly of the housing sections 18,19 to the busbars 3-10, ends of a ground strap 42 may be fastened to respective metal top housing panels 9 of the busway sections 1,2 by, for example, fitting openings 43 in the ends of the ground shunt or strap 42 over threaded posts 44 extending from the respective metal top panels 9 and securing the ground shunt or strap 42 by appropriate washers and nuts (not shown) or other fasteners. As illustrated, the ground strap 42 is configured to include a raised bridge section 45 that extends over the splice, which may optionally be surrounded by a heat-shrink insulator sleeve (not shown). An insulating top cover 46 may further be installed over the splice and secured by fasteners 47 to cover the ground strap 42, and a lower cover 48 may be added to the opposite side of the splice and secured by fasteners 49 to cover and/or provide support for one or more data or communications cables that run along tracks or passages provided at the side or bottom of the busway. Finally, the entire may be enclosed by a shield housing 50. A fully assembled splice of FIG. 1, minus the shield housing 50, is illustrated in FIG. 6.

In a variation of the preferred embodiment of FIGS. 1-6, the splice may be adapted to accommodate different size busbars and busbar connectors. In particular, u-shaped connectors 60,61 may be modified to have smaller dimensions than the u-shaped connectors 14-17 shown in FIGS. 1 and 2, thereby accommodating busbars that are also smaller than those shown in FIG. 1. To enable the smaller u-shaped connectors 60,61 to fit within the housing sections 18,19 of FIGS. 1 and 3 without having to provide different housing sections, spacers or shims 62,63 having exterior dimensions that match those of connectors 14-17 may be fitted over respective sides of the smaller u-shaped connectors 60,61.

What is claimed is:

1. A connector for use in electrically connecting a pair of busbars extending from different busway sections, the busbars being axially aligned and having facing end surfaces, comprising:
   an electrically conductive elongated connector member having a generally u-shaped cross-section into which respective ends of the pair of busbars are fitted; and
   a pair of electrically conductive multi-contact louvers,
   wherein parallel sidewalls of the electrically conductive elongated connector member include dovetail grooves into which the louvers are fitted such that respective side edges of the louvers extend into dovetail portions of the grooves, said dovetail portions retaining the louvers, and
   wherein the width of the louvers exceeds a width of the grooves to cause the individual contact sections of the louvers to bow outward away from the surface of the groove to pressingly engage surfaces of the busbars when the busbars are inserted into the electrically conductive elongated connector member.

2. A splice assembly for joining two busway sections of a busway system and for electrically connecting individual pairs of busbars extending from each of the busway section, the individual pairs of busbars being axially aligned and facing end surfaces, comprising:
   at least four electrically conductive elongated connector members having a generally u-shaped cross-section, each electrically conductive elongated connector member including a pair of louvers extending along respective sidewalls of the elongated members;
   a pair of insulative housing sections, each said housing section including two sidewalls connected to a top/bottom wall extending transversely between the sidewalls, and an isolating wall extending transversely from the top/bottom wall midway between the two sidewalls to form two longitudinally-extending compartments, said compartments each being arranged to receive and hold respective ones of the electrically conductive elongated connector members, and said isolating wall electrically insulating an electrically conductive elongated connector member in a first one of the compartments from an electrically conductive elongated connector member in a second one of the compartments; and
   a planar insulator extending between a first pair of electrically conductive elongated connector members in one of the insulative housing sections and a second pair of electrically conductive elongated connector members in a second one of the insulative housing sections,
   wherein said splice assembly is assembled to said busbars by fitting said electrically conductive elongated connector members over axially aligned pairs of said busbars and fastening said insulative housing sections to each other to capture said busbars and the planar insulator, in order to correct an antecedent base issue, within a completed housing formed by said two insulative housing sections.

3. The splice assembly as claimed in claim 2, wherein said compartments of said insulative housing sections each includes a pair of bulkheads having a u-shaped opening corresponding to an exterior shape of the electrically conductive elongated conductor members for receiving and aligning said electrically conductive elongated conductor members within respective said compartments.

4. The splice assembly as claimed in claim 3, further comprising resilient hook members extending from said sidewalls and isolating wall of the insulative housing sections for retaining said electrically conductive elongated connector members within said compartments.

5. The splice assembly as claimed in claim 2, further comprising resilient hook members extending from said sidewalls and isolating wall of the insulative housing sections for retaining said electrically conductive elongated connector members within said compartments.

6. The splice assembly as claimed in claim 2, wherein parallel facing interior surfaces of each said electrically conductive elongated connector member include dovetail grooves into which the louvers are fitted such that respective side edges of the louvers extend into dovetail portions of the grooves, said dovetail portions retaining the louvers, and wherein the width of the louvers exceeds a width of the grooves to cause the individual contact sections of the louvers to bow outward away from the surface of the groove to pressingly engage surfaces of the busbars when the busbars are inserted into the electrically conductive elongated connector member.

7. The splice assembly as claimed in claim 2, wherein a height of said isolating wall is less than a height of said sidewalls of the insulative housing sections to capture said planar member between respective said isolating walls of the insulative housing sections when the insulative housing sections are assembled to each other.

8. The splice assembly as claimed in claim 2, further comprising mating alignment members extending from said insulative housing sections for aligning said insulative housing sections when assembled together, and fasteners for fastening said insulative housing sections to each other.

9. The splice assembly as claimed in claim 2, further comprising a ground shunt in the form of a strap that extends between and is secured to metal shield housings of respective busway sections.

10. The splice assembly as claimed in claim 9, further comprising an insulative cover that extends over said ground shunt between said busway sections.

11. The splice assembly as claimed in claim 2, further comprising a cable harness securing member for securing at least one cable extending along an exterior of said busway.

12. The splice assembly as claimed in claim 2, further comprising spacers that fit over sidewalls of the electrically conductive elongated connector members to enable electrically conductive elongated connector members of different sizes to fit into said compartments of the insulative housing sections.

13. The splice assembly as claimed in claim 2, wherein the busway system is a modular "Continuous Bus Power Distribution System" (CBusPDS).

* * * * *